United States Patent
Choi et al.

(10) Patent No.: US 8,698,965 B2
(45) Date of Patent: Apr. 15, 2014

(54) ROBOT

(75) Inventors: Byung Kwon Choi, Seoul (KR); Woo Sup Han, Yongin-si (KR); Yong Jae Kim, Seoul (KR); Tae Sin Ha, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1118 days.

(21) Appl. No.: 12/654,530

(22) Filed: Dec. 22, 2009

(65) Prior Publication Data

US 2010/0180709 A1     Jul. 22, 2010

(30) Foreign Application Priority Data

Jan. 22, 2009  (KR) ......................... 10-2009-0005442

(51) Int. Cl.
*H04N 5/64* (2006.01)

(52) U.S. Cl.
USPC .......................................................... 348/839

(58) Field of Classification Search
USPC ............ 348/839; 700/245; 180/9.21; 378/38; 345/156
See application file for complete search history.

(56) References Cited

U.S. PATENT DOCUMENTS

| | | | |
|---|---|---|---|
| 6,602,227 B1 | 8/2003 | Cimino et al. | |
| 7,158,859 B2 | 1/2007 | Wang et al. | |
| 7,164,970 B2 * | 1/2007 | Wang et al. .................. | 700/245 |
| 7,171,286 B2 | 1/2007 | Wang et al. | |
| 7,204,825 B2 | 4/2007 | Cimino et al. | |
| 7,304,581 B2 | 12/2007 | Miyazaki et al. | |
| D563,443 S | 3/2008 | Ahn et al. | |
| D579,035 S | 10/2008 | Kim et al. | |
| 8,195,333 B2 | 6/2012 | Ziegler et al. | |
| 2002/0081937 A1 | 6/2002 | Yamada et al. | |
| 2004/0068208 A1 | 4/2004 | Cimino et al. | |
| 2006/0045060 A1 | 3/2006 | Miyazaki et al. | |
| 2006/0119572 A1 * | 6/2006 | Lanier ........................... | 345/156 |
| 2006/0229034 A1 | 10/2006 | Gizis et al. | |
| 2007/0269001 A1 * | 11/2007 | Maschke ......................... | 378/38 |
| 2007/0291109 A1 | 12/2007 | Wang et al. | |
| 2008/0009728 A1 | 1/2008 | Malchow et al. | |
| 2008/0179115 A1 * | 7/2008 | Ohm et al. .................... | 180/9.21 |

OTHER PUBLICATIONS

Office Action mailed Sep. 5, 2012 from U.S. Appl. No. 12/656,022.
U.S. Appl. No. 12/656,022, filed Jan. 13, 2010, Byung Kwong Choi et al., Samsung Electronics Co., Ltd.
US Office Action mailed Feb. 5, 2013 in U.S. Appl. No. 12/656,022.
U.S. Notice of Allowance from U.S. Appl. No. 12/656,022, mailed Jun. 19, 2013.

* cited by examiner

*Primary Examiner* — Allen Wong
(74) *Attorney, Agent, or Firm* — Staas & Halsey LLP

(57) ABSTRACT

A robot rotates frontward, rearward, clockwise, or counterclockwise such that a display device is matched with the eye position of a user. The robot includes a body, a display device, and at least one bending device. The display device includes a recognition unit to rotate about the body according to the position of the user. The recognition unit detects a position of a user. The bending device couples the body with the display device such that the body and the display device rotate frontward, rearward, clockwise, or counterclockwise according to a detection state of the recognition unit.

17 Claims, 13 Drawing Sheets

ROBOT

CROSS-REFERENCE TO RELATED APPLICATIONS

This application claims the benefit of Korean Patent Application No. 10-2009-0005442, filed on Jan. 22, 2009, in the Korean Intellectual Property Office, the disclosure of which is incorporated herein by reference.

BACKGROUND

1. Field

The embodiments relate to a robot. More particularly, the embodiments relate to a robot capable of improving affinity with a user by recognizing the eye position of a user and setting a display device corresponding to the eye position of the user.

2. Description of the Related Art

In general, a robot stores various pieces of information, such as information necessary for an operation, in a body. The information stored in the body can be displayed through a display device fixed to the body under the control of a user.

However, according to the conventional robot, since the display device is fixed to the body at a predetermined height, eyes of a user may not match the height of the display device.

Thus, even if a user watches the display device by looking at the robot while manipulating the robot at a close distance, since the display device does not meet the eyes of the user, the user may not read information displayed on the display device.

Further, when a user is tall, since eyes of the user are positioned higher than the display device, the user must bend over to look at the display device. Further, when a user is short, since eyes of the user are positioned lower than the display device, the user must lift his/her head toward the display device.

However, currently used entertainment robots have various heights according to purposes thereof. The entertainment robots must be transformed to various postures in order to allow persons having various heights and postures to use the robots, but such transformation of the robot cannot be achieved in the conventional robots.

Thus, it is necessary to provide a friendly robot having a display device which can rotate according to an eye position of a user. In detail, the display device must match with eyes of the user such that the robot can easily communicate with the user at a short distance. In still more detail, the degree of freedom and flexibility of the robot must be improved while the robot is moving to match the display device with the eyes of the user.

SUMMARY

Accordingly, it is an aspect to provide a robot capable of rotating a display device frontward, rearward, clockwise and counterclockwise such that the display device can match the eyes of the user.

It is another aspect to provide a robot, capable of improving affinity with a user by improving the degree of freedom and flexibility of the display device while the robot is operating to match a display device with the eyes of the user.

Additional aspects and/or advantages of the disclosure will be set forth in part in the description which follows and, in part, will be apparent from the description, or may be learned by practice of the disclosure.

The foregoing and/or other aspects are achieved by providing a robot including a body, a display device including a recognition unit, which detects a position of a user, to rotate about the body according to the position of the user, and at least one bending device coupling the body with the display device such that the body and the display device rotate frontward, rearward, clockwise, or counterclockwise according to a detection state of the recognition unit.

The bending device may include a first bending unit coupled with the body and a second bending unit coupled with the first bending unit to rotate frontward, rearward, clockwise, or counterclockwise.

The first bending unit may be coupled with the second bending unit by at least one pan/tilt driving unit.

The pan/tilt driving unit may include at least one pan driving unit allowing the second bending unit and the display device to rotate clockwise or counterclockwise and at least one tilt driving unit allowing the second bending unit and the display device to rotate frontward or rearward.

The tilt driving unit may include at least one tilt driving unit installed in the first bending unit and at least one tilt driving unit installed in the second bending unit.

The robot further may include at least one first sub pan/tilt driving unit coupling the body with the first bending unit, wherein the first sub pan/tilt driving unit allows the first and second bending units and the display device to rotate frontward, rearward, clockwise, or counterclockwise.

The robot further may include at least one second sub pan/tilt driving unit coupling the second bending unit with the display device, wherein the second sub pan/tilt driving unit allows the display device to perform tilt/pan motion.

The tilt driving unit may include a ratchet structure having a solenoid switch.

The body may include a sliding plate slidably moving back and forth.

A rack gear may be fixedly mounted on the sliding plate, and a pinion gear may be fixedly mounted on the body such that the pinion gear is engaged with the rack gear.

The body may include at least one support unit to fix a position of the robot.

It is another aspect to provide a robot including a body, at least one bending device coupled with the body to rotate frontward, rearward, clockwise, or counterclockwise according to a posture and an eye position of a user, and a display device coupled with the bending device to provide various information to the user.

The display device may include a recognition unit to detect the posture and the eye position of the user.

The bending device may include a first bending unit coupled with the body, and a second bending unit coupled with the first bending unit by a pan/tilt driving unit.

The body may be coupled with the bending device by at least one first sub pan/tilt driving unit, and the bending device may be coupled with the display device by at least one second sub pan/tilt driving unit.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
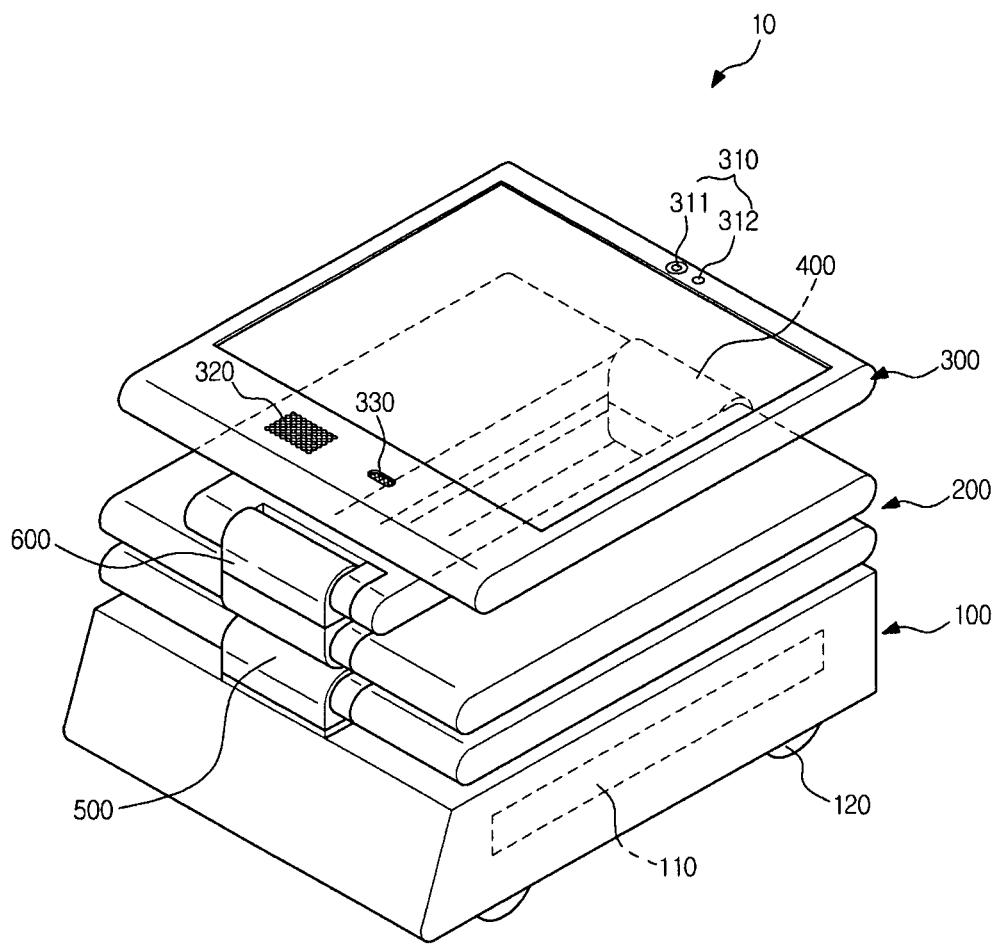
FIG. 1 is a perspective view showing an idle state of a robot according to an embodiment.

Reference will now be made in detail to the embodiments, examples of which are illustrated in the accompanying drawings, wherein like reference numerals refer to the like elements throughout. The embodiments are described below to explain the disclosure by referring to the figures.

Figure 2:
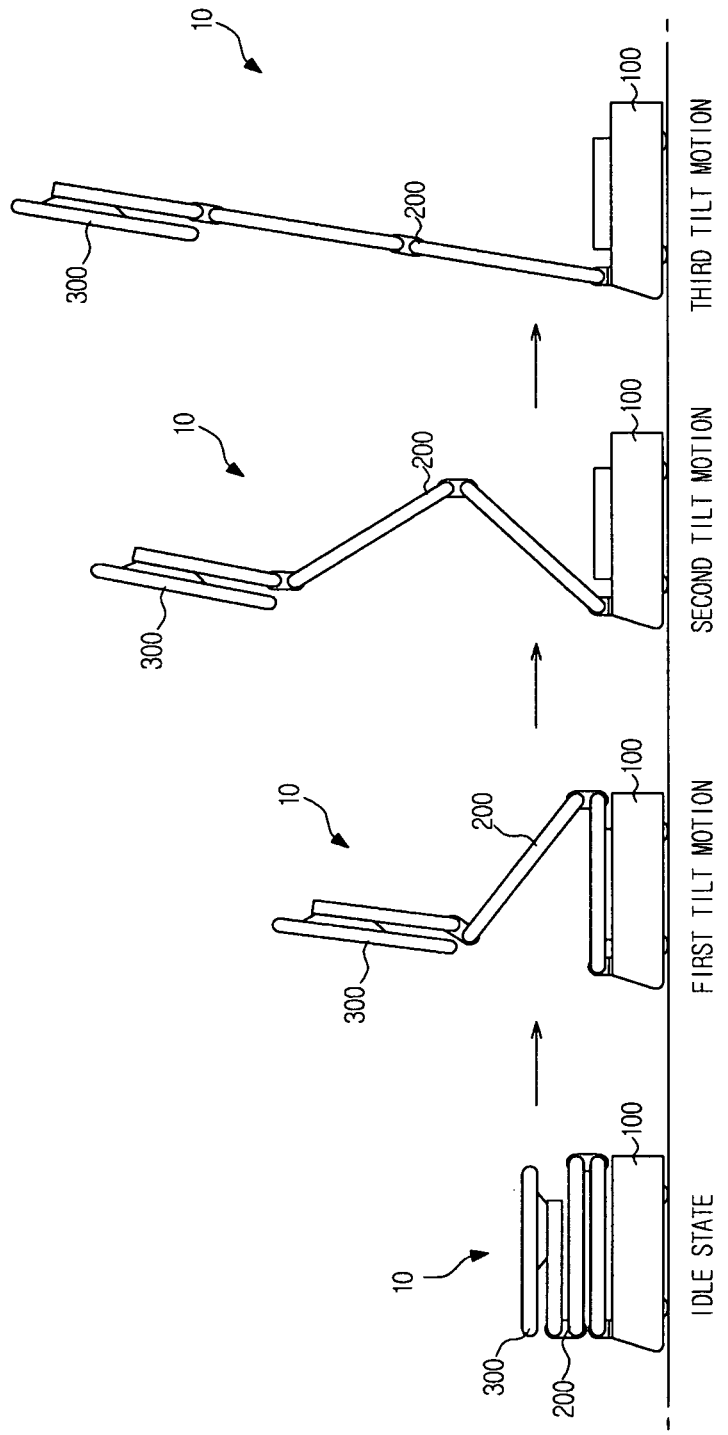
FIG. 2 is a sectional view showing tilt motions of the robot according to an embodiment.
Figure 3:
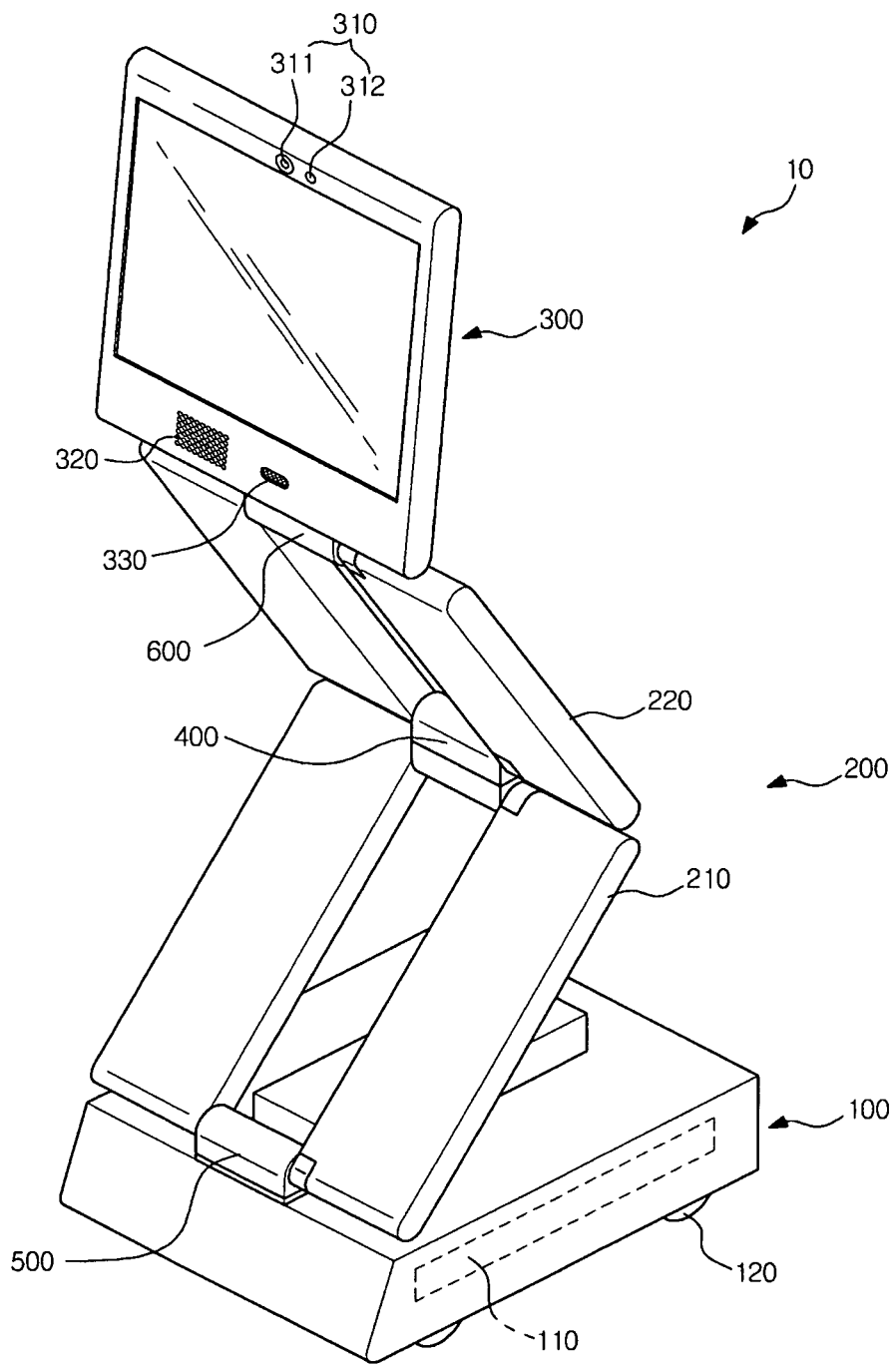
FIG. 3 is a perspective view showing one of the tilt motions of the robot according to an embodiment.
Figure 4:
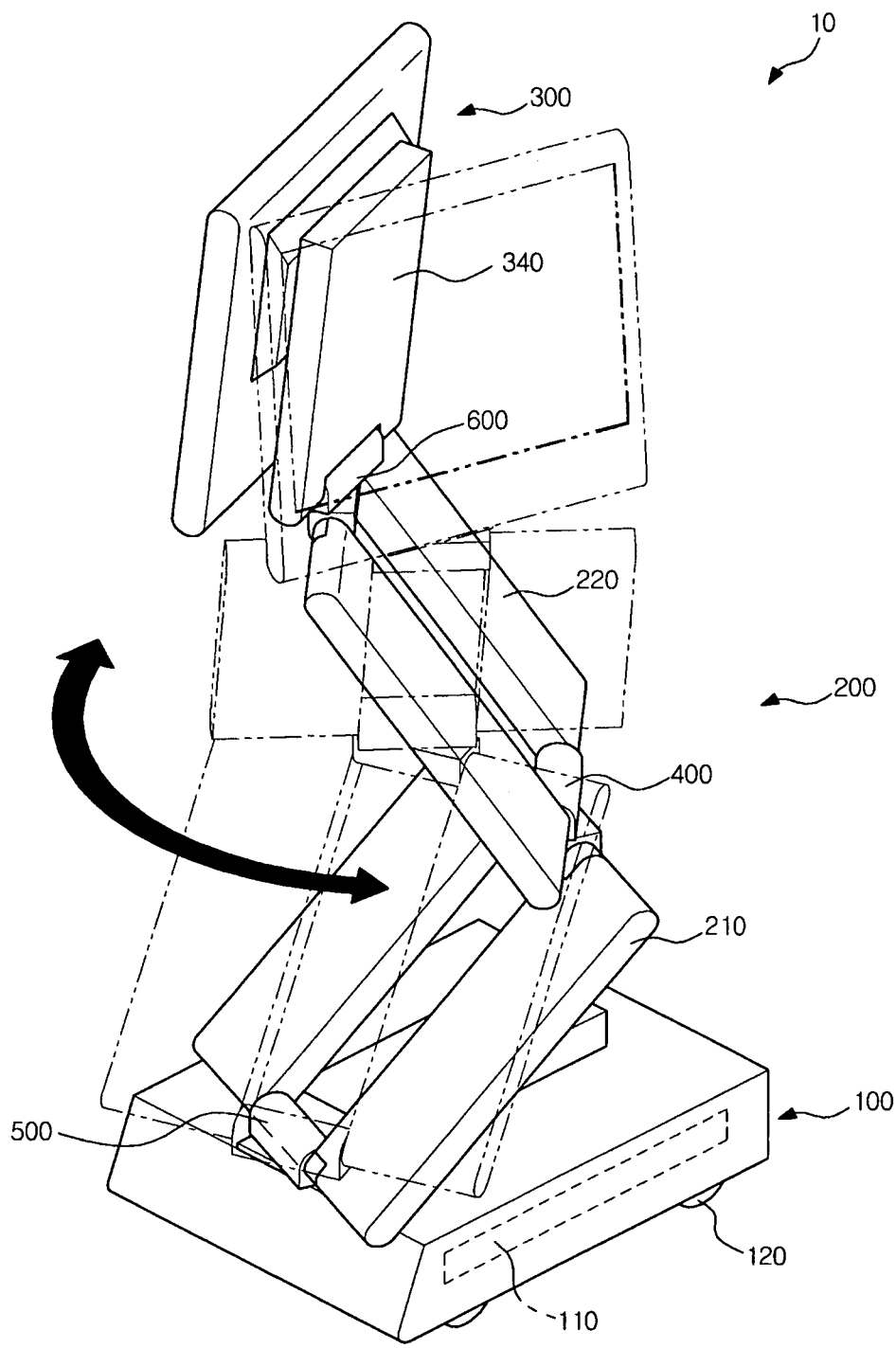
FIG. 4 is a perspective view showing pan and tilt motions of the robot according to an embodiment.

FIG. 1 is a perspective view showing an idle state of a robot 10, and FIG. 2 is a sectional view showing tilt motions of the robot 10. FIG. 3 is a perspective view showing one of the tilt motions of the robot 10, and FIG. 4 is a perspective view showing pan and tilt motions of the robot 10.

As shown in FIGS. 1 to 4, the robot 10 alternately repeats the idle state and at least one motion.

The robot 10 includes a body 100, a bending device 200, and a display device 300. The bending device 200 is coupled with the body 100 to rotate frontward, rearward, clockwise or counterclockwise according to the eye position of a user. The display device 300 is coupled to the bending device 200 to provide various information to a user.

The body 100 includes a control unit 110 and a movable unit 120. The control unit 110 controls the position and various operations of the robot 10 including the display device 300. The movable unit 120 operates according to commands of the control unit 110.

The control unit 110 controls the operation of a pan/tilt driving unit 400, which is described later, and the operation of first and second sub pan/tilt driving units 500 and 600 according to the eye position of a user. The control unit 110 can control the movable unit 120. The control unit 110 may be any unit, such as communication units, capable of communicating with another PC or another robot.

The movable unit 120 can move the robot 10 under a command issued from the control unit 120. The movable unit 120 may include a wheel or a belt. The movable unit 120 is mounted on a bottom surface of the robot 10 such that the robot 10 can move back, forward, left, or right on the ground.

The display device 300 includes a recognition unit 310 to detect a user. The recognition unit 310 may include a camera 311 and a sensor 312 to detect the posture of the user and the eye position of the user.

The camera 311 is a vision recognition camera employing a vision recognition technology generally known to those skilled in the art, and includes a camera to detect a user's face from an image of a user photographed by the camera 311.

The sensor 312 is a distance measuring sensor employing a distance measuring technology generally known to those skilled in the art. The sensor 312 is installed at one side of the camera 311 to move together with the camera 311. Accordingly, the sensor 312 includes a sensor sufficient to measure the distance from the detected user's face to the sensor after the user's face has been detected.

The body 100 is coupled with the display device 300 by the bending device 200 including the pan/tilt driving unit 400.

Reference numeral 320 represents a microphone to receive the user's voice, and reference numeral 330 represents a speaker to output the user's voice. Reference numeral 340 is a coupling plate to couple the display device 300 to the second sub pan/tilt driving unit 600.

Figure 5A:
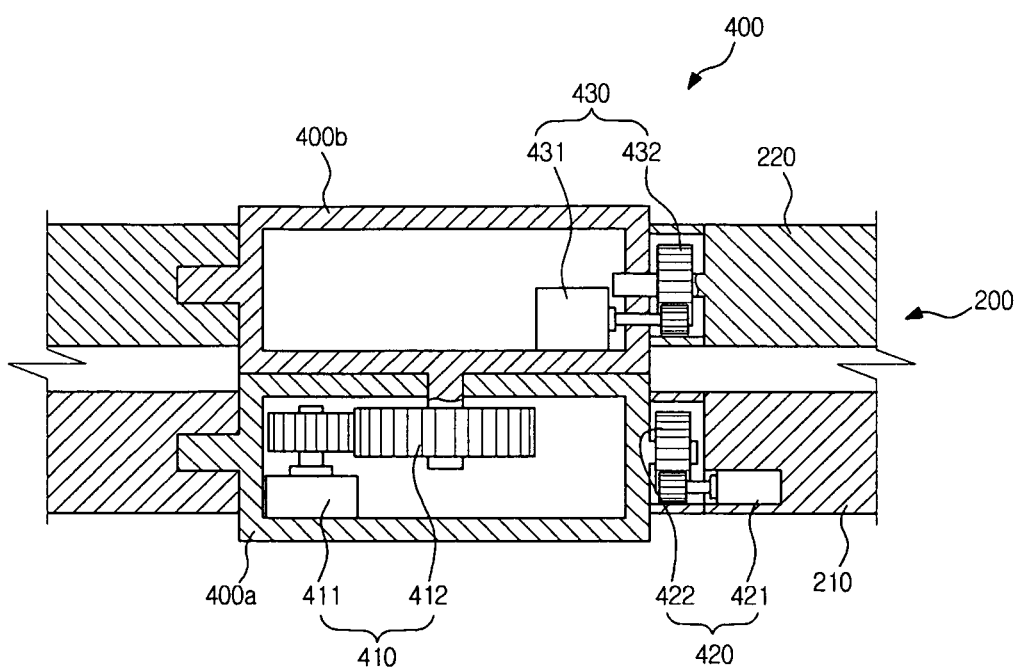
FIG. 5A is a sectional view showing a pan/tilt driving unit according to an embodiment.
Figure 5B:
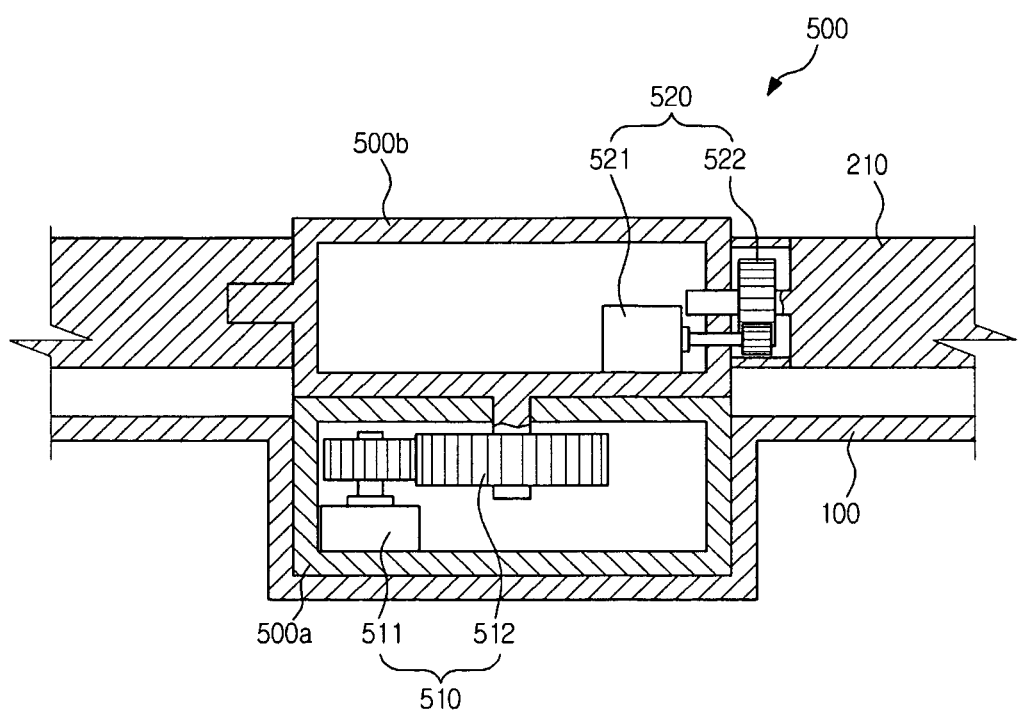
FIG. 5B is a sectional view showing a first sub pan/tilt driving unit according to an embodiment.
Figure 5C:
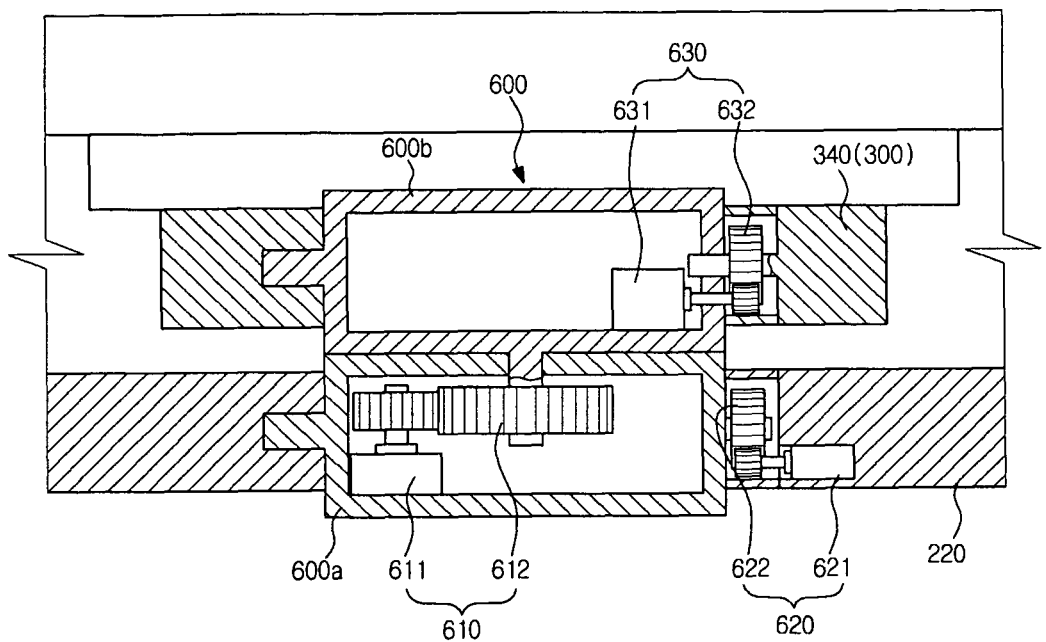
FIG. 5C is a sectional view showing a second sub pan/tilt driving unit according to an embodiment.
Figure 6:
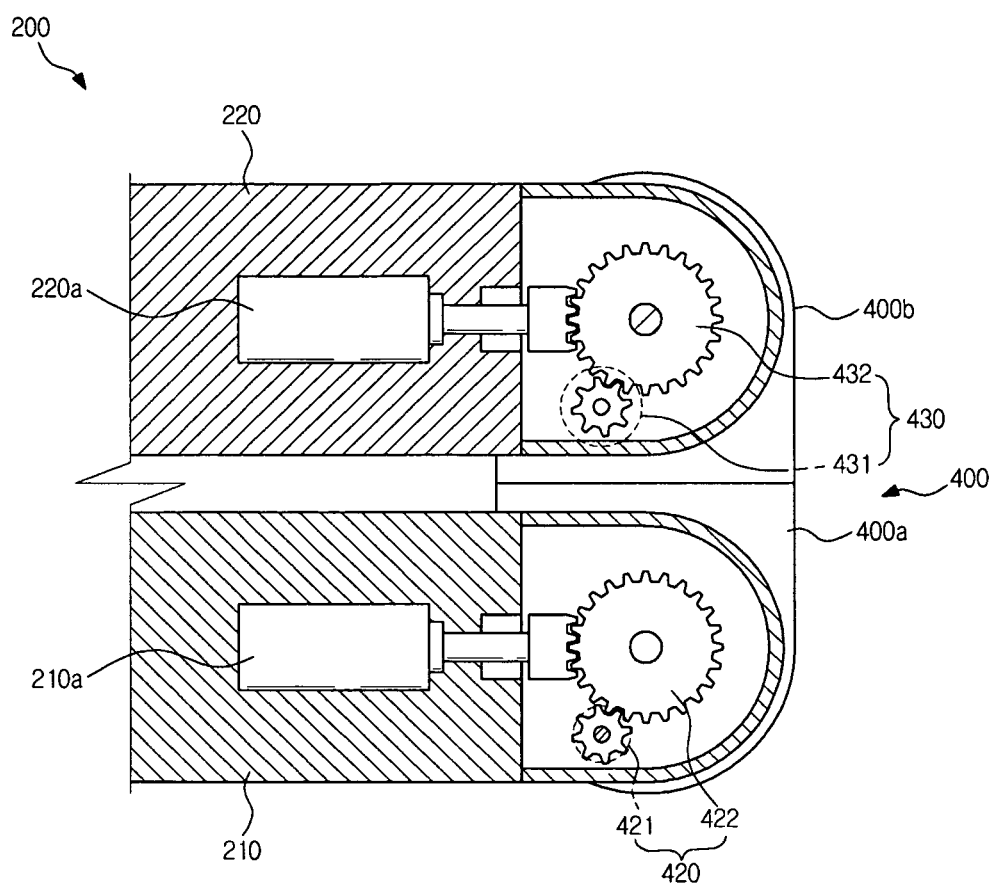
FIG. 6 is a sectional view showing tilt driving units according to an embodiment when the operations of the tilt driving units have been completed.
Figure 7:
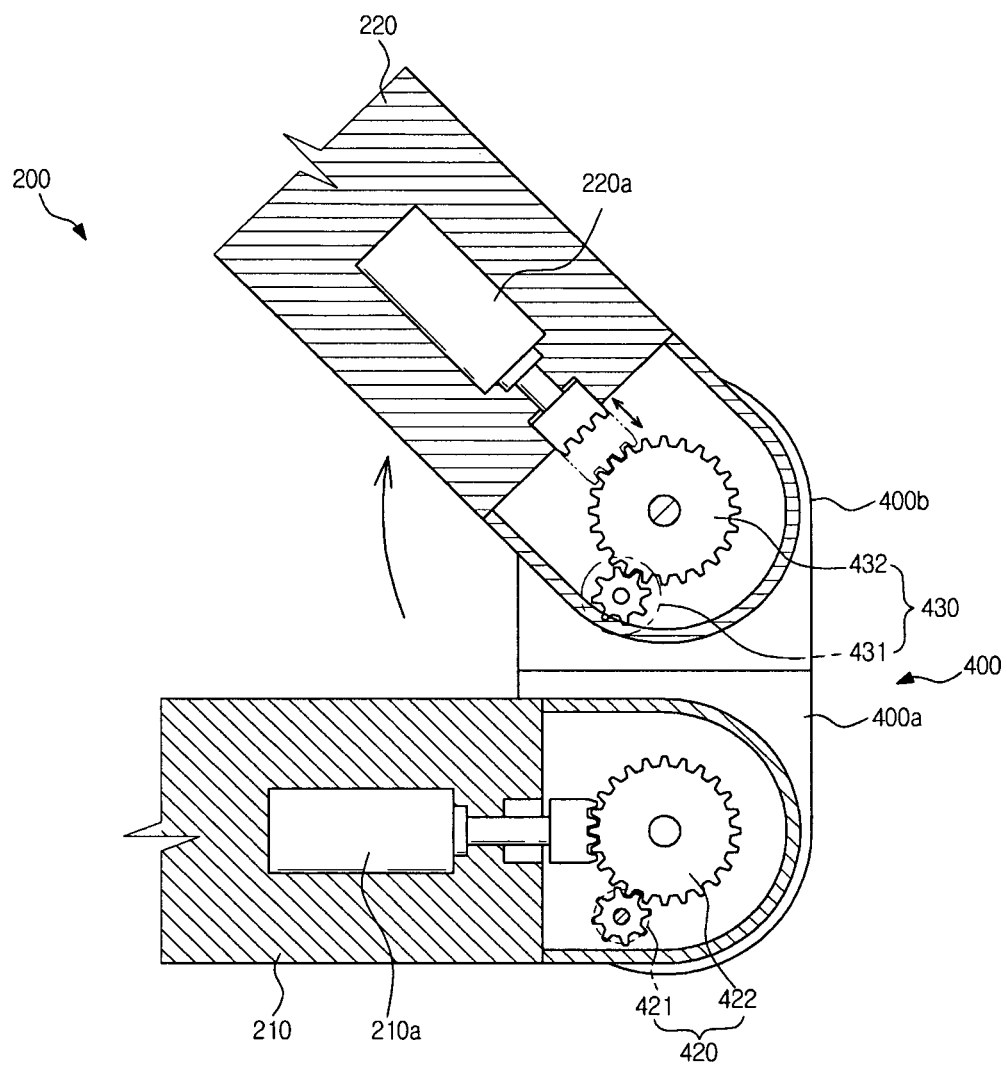
FIG. 7 is a sectional view showing the tilt driving units when the tilt driving units are operating.

FIG. 5A is a sectional view showing the pan/tilt driving unit 400, and FIG. 5B is a sectional view showing the first sub pan/tilt driving unit 500. FIG. 5C is a sectional view showing the second sub pan/tilt driving unit 600. FIG. 6 is a sectional view showing tilt driving units when the operation of the tilt driving units have been completed, and FIG. 7 is a sectional view showing the tilt driving units when the tilt driving units are operating.

As shown in FIGS. 4 to 7, the bending device 200 of the robot 10 includes a first bending unit 210 coupled to the body 100, and a second bending unit 220 coupled to the first bending unit 210 such that the second bending unit 220 can be bent frontward, rearward, clockwise or counterclockwise.

As shown in FIG. 5A, the bending device 200 is provided therein with the pan/tilt driving unit 400 such that the second bending unit 220 can rotate frontward, rearward, clockwise or counterclockwise about the first bending unit 210. The pan/tilt driving unit 400 includes a pan driving unit 410 installed between the first and second bending units 210 and 220 to enable the second bending unit 220 to rotate clockwise and counterclockwise, and tilt driving units 420 and 430 for allowing the second bending unit 220 to perform the tilt motion in the front and rear directions.

The pan driving unit 410 allows the second bending unit 220 and the display device 300 to rotate clockwise and counterclockwise about the first bending unit 210.

The pan driving unit 410 includes a pan motor 411 and a pan gear 412 coupled to the pan motor 411. The pan motor 411 can rotate in a left direction or a right direction to adjust a rotation direction of the display device 300 according to the posture of the user and the eye position of the user. At least one pan gear 412 is engaged with the pan motor 411 to allow the second bending unit 220 and the display device 300 to simultaneously perform pan motion.

The pan motor 411 is fixed to a first housing 400a coupled to the first bending unit 210, and the pan gear 412 is fixed to a second housing 400b coupled to the second bending unit 220. Therefore, the pan gear 412 is rotated according to the rotation of the pan motor 411, so that the second bending unit 220 and the display device 300 rotate clockwise or counterclockwise.

The tilt driving units 420 and 430 allow the second bending unit 220 and the display device 300 to perform tilt motion in the front and rear directions about the first bending unit 210. The tilt driving units 420 and 430 include the first tilt driving unit 420 installed in the first bending unit 210, and the second tilt driving unit 430 installed in the second bending unit 220.

The first tilt driving unit 420 includes a first tilt motor 421 and a first tilt gear 422 coupled to the first tilt motor 421. The second tilt driving unit 430 includes a second tilt motor 431 and a second tilt gear 432 coupled to the second tilt motor 431.

The first and second tilt gears 422 and 432 can rotate up or down such that the rotation direction of the display device 300 can be adjusted according to the posture of a user and the eye position of the user. At least one first tilt gear 422 and at least one second tilt gear 432 may be engaged with the first and second tilt motors 421 and 431, respectively, to allow the second bending unit 220 and the display device 300 to perform tilt motion.

The first and second tilt motors 421 and 431 are fixedly installed in the first bending unit 210 and the second housing 400*b*, and the first and second tilt gears 422 and 432 are fixedly installed in the first bending unit 210 and the second housing 400*b* such that the first and second tilt gears 422 and 432 are engaged with the first and second tilt motors 421 and 431. Accordingly, as the first tilt motor 421 rotates, the first tilt gear 422 rotates so that the first and second housings 400*a* and 400*b*, the second bending unit 220 and the display device 300 perform tilt motion in the front and rear directions. In addition, as the second tilt motor 431 rotates, the second tilt gear 432 rotates, so that the second bending unit 220 and the display device 300 perform tilt motion.

Meanwhile, as shown in FIGS. 6 and 7, the first tilt gear 422 or the second tilt gear 432, which is rotated up or down, has a ratchet structure. Accordingly, after a predetermined time elapses, the first tilt gear 422 or the second tilt gear 432 is locked by a first solenoid switch 210*a* or a second solenoid switch 220*a*, so that the bending device 200 can be fixed at a predetermined tilt angle.

As shown in FIG. 5B, the body 100 is coupled with the first bending unit 210 by the first sub pan/tilt driving unit 500 in order to enable the first bending unit 210 to rotate forward, rearward, clockwise, or counterclockwise.

The first sub pan/tilt driving unit 500 includes a first sub pan driving unit 510 to enable the pan motion of the first bending unit 210 and a first sub tilt driving unit 520 to enable the tilt motion of the first bending unit 210.

The sub pan driving unit 510 includes a first sub pan motor 511 and a first sub pan gear 512 coupled to the first sub pan motor 511. The first sub tilt driving unit 520 includes a first sub tilt motor 521 and a first sub tilt gear 522 coupled to the first sub tilt motor 521.

The first sub pan motor 511 is fixedly mounted on a first lower sub housing 500*a*, so that the first pan motor 511 is coupled with the first sub pan gear 512 fixedly mounted on a first upper sub housing 500*b*. The first sub tilt motor 521 and the first sub tilt gear 522 are fixedly mounted on the first upper sub housing 500*b*. The ratchet structure employing the first and second solenoid switches 210*a* and 220*a* is adapted to the first sub tilt gear 522 to lock the first sub tilt gear 522 so that the bending device 210 can be fixed at a predetermined tilt angle.

In addition, as shown in FIG. 5C, the second bending unit 220 is coupled with the display device 300 by the second sub pan/tilt driving unit 600 in order to enable the tilt motion/pan motion of the display device 300. The second sub pan/tilt driving unit 600 includes a second sub pan driving unit 610 to enable the pan motion of the display device 300, and second sub tilt driving units 620 and 630 to enable the tilt motion of the display device 300.

The second sub pan driving unit 610 may include a second sub pan motor 611 and a second sub pan gear 612 coupled with the second sub pan motor 611.

The second sub tilt driving units 620 and 630 may include the second lower sub tilt driving unit 620 coupled with the second bending unit 220, and the second upper sub tilt driving unit 630 coupled with the display device 300.

The second lower and upper tilt driving units 620 and 630 include second lower and upper sub tilt motors 621 and 631, and second lower and upper sub tilt gears 622 and 632 coupled with the second lower and upper sub tilt motors 621 and 631, respectively.

The second sub pan motor 611 is fixedly mounted on a second lower sub housing 600*a* so that the second sub pan motor 611 is coupled with the second sub pan gear 612 fixedly mounted on a second upper sub housing 600*b*.

The second lower and upper sub tilt motors 621 and 631 are fixedly mounted on the second bending unit 220 and the second upper sub housing 600*b*. The second lower and upper sub tilt gears 622 and 632 are fixedly mounted on the second bending unit 220 and the second upper sub housing 600*b*, respectively, such that the second lower and upper sub tilt gears 622 and 632 are engaged with the second lower and upper sub tilt motors 621 and 631. The ratchet structure employing the solenoid switches 210*a* and 220*a* is adapted to the second lower and upper sub tilt gears 622 and 632 to lock the second lower and upper sub tilt gears 622 and 632, so that the robot 10 can be fixed at a predetermined tilt angle.

Hereinafter, the operation of the robot 10.

If a user calls the robot 10 by a touch, a gesture, or voice of the user, the robot 10 looks for the user. Then, the robot 10 detects the facial image of the user through the recognition unit 310 installed in the display device 300 to recognize the posture of the user. In detail, the user may hold postures such as an upright posture, a sitting posture, and a supine posture.

Then, the robot 10 performs the facial recognition of the user to determine if the user is registered therein. If the user has been recognized after the facial recognition has been performed, the robot 10 changes the posture thereof according to a memorized posture of the user to provide a display to the user.

If the user has not been registered in the robot 10, the robot 10 must be set to correspond to the eye position of the user. To this end, the robot 10 detects the facial image of the user and then faces the user. In the front of the user, the robot 10 detects detection points of the facial image of the user and analyzes the eye position of the user through the recognition unit 310.

Thereafter, the robot 10 determines the operation of the bending unit 200 according to the eye position of the user. The operation of the bending unit 200 is determined based on values set according to the eye positions of the user. In other words, it is determined if one bending unit 200 is used or not, and then rotational angles of the bending unit 200 are determined according to the eye position of the user.

For example, as shown in FIG. 2, if a short child calls the robot 10, the robot 10 adjusts the height thereof using one bending unit 200 to maintain a first tilt motion. If a tall adult calls the robot 10, the robot 10 spreads two bending units 200 as high as possible such that a screen of the display device 300 is adjusted to the eye position of the user, thereby maintaining a third tilt motion.

Further, the robot 10 according can perform various motions according to the posture of a user and the eye position of the user by using the bending unit 200, at least one pan/tilt driving unit 400, and the first and second sub pan/tilt driving units 500 and 600.

The robot 10, which has been set according the eye position of a user, performs various services according to the command of the user, while maintaining the operational states shown in FIGS. 2 to 4. Then, as shown in FIG. 1, the robot 10 returns to an idle state after the services have been terminated.

Accordingly, the robot 10 can rotate the display device 300 in an up, down, left, or right direction such that the screen of the display device 300 is matched with the eye position of the user.

In addition, since the degree of freedom and flexibility of the robot can be improved during the operation of matching the screen of the display device 300 with the eye position of the user, affinity of the robot 10 with the user can be improved.

Figure 8:
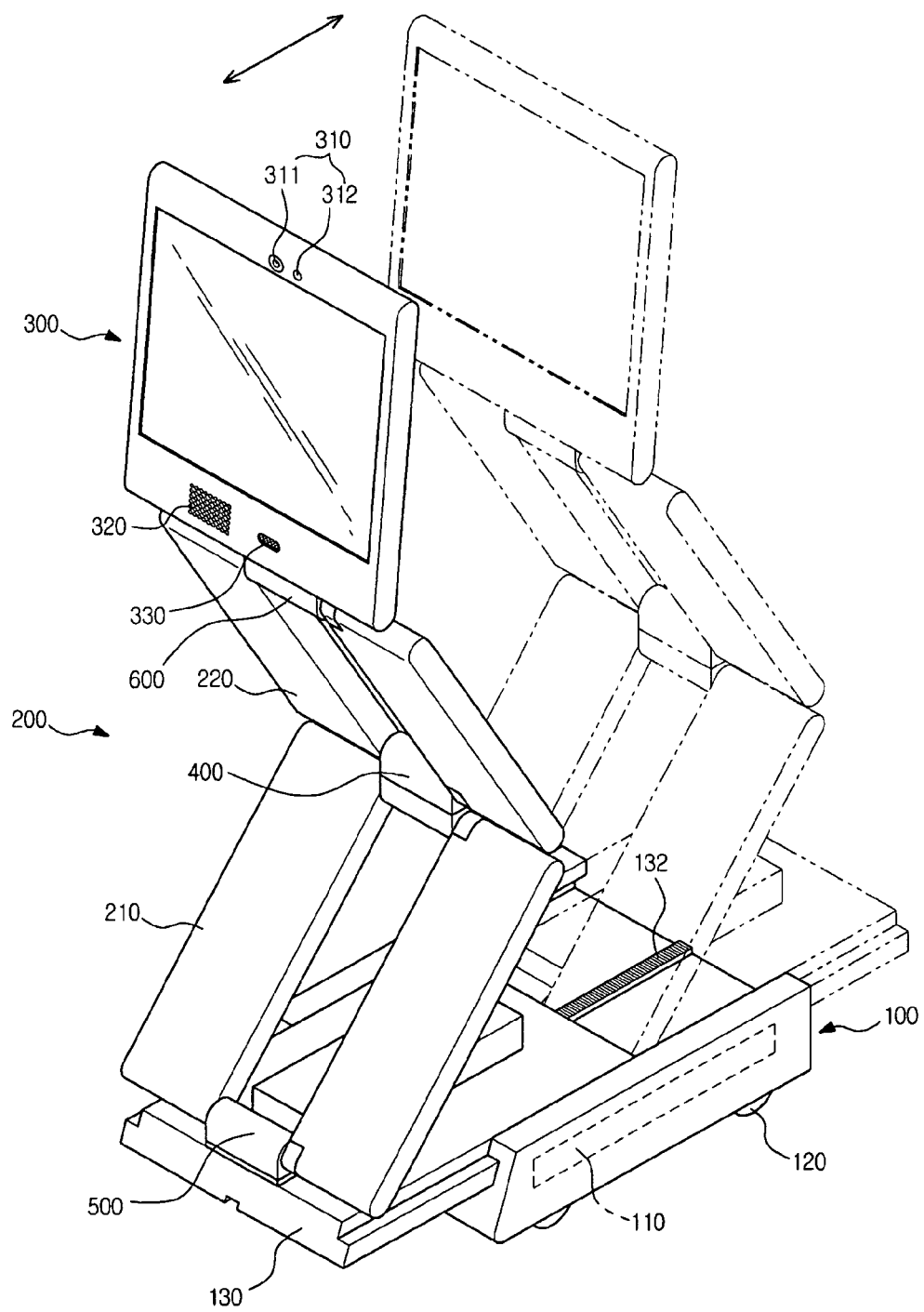
FIG. 8 is a perspective view showing a robot according to a second embodiment.
Figure 9:
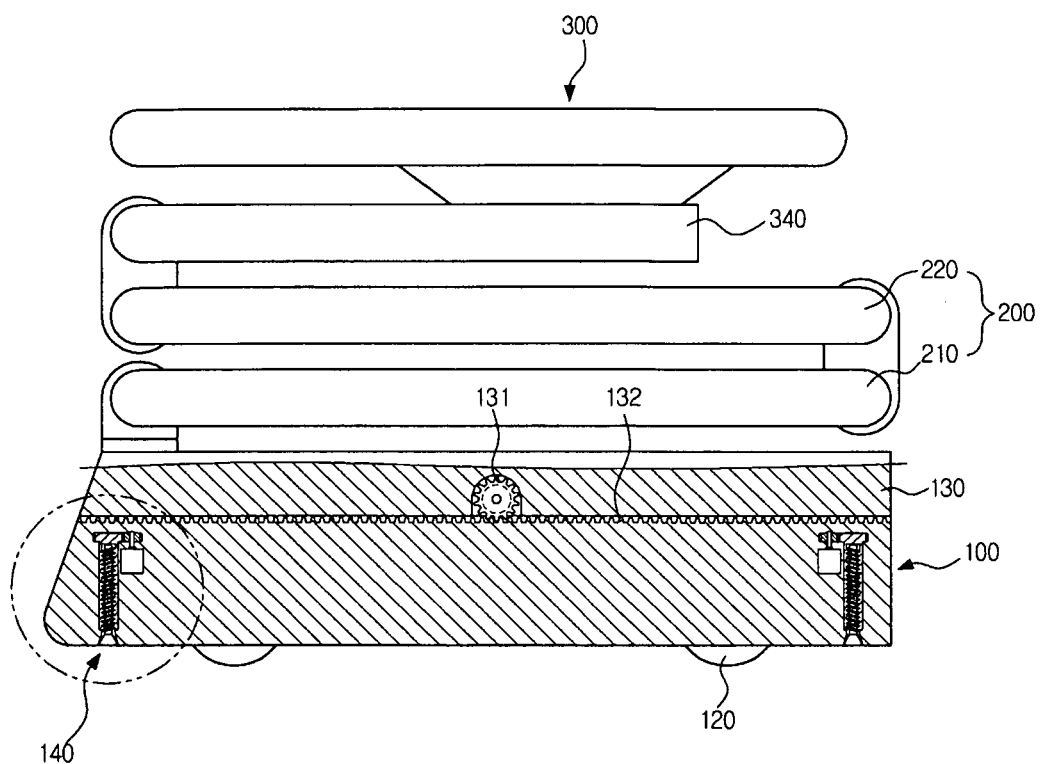
FIG. 9 is a perspective view showing the robot according to the embodiment of FIG. 8.
Figure 10:
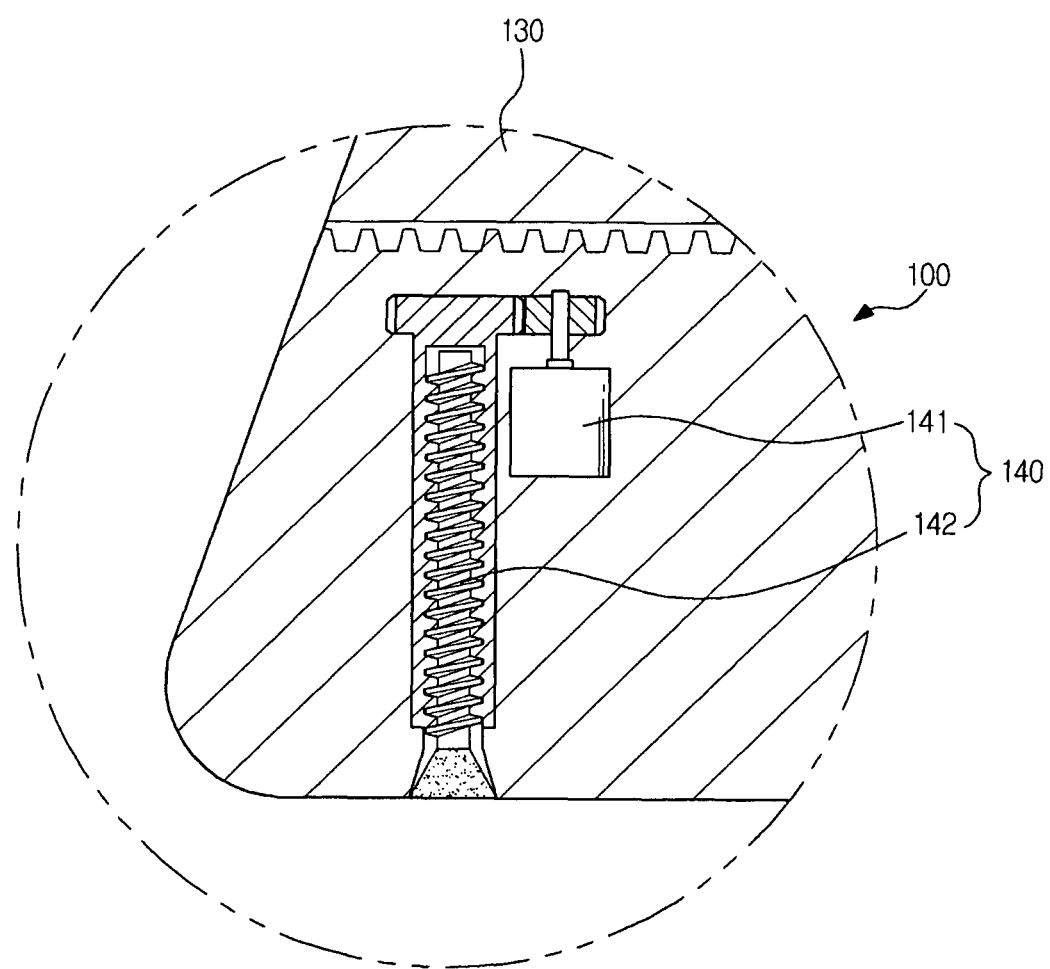
FIG. 10 is an enlarged view showing a portion of the robot of FIG. 9.
Figure 11:
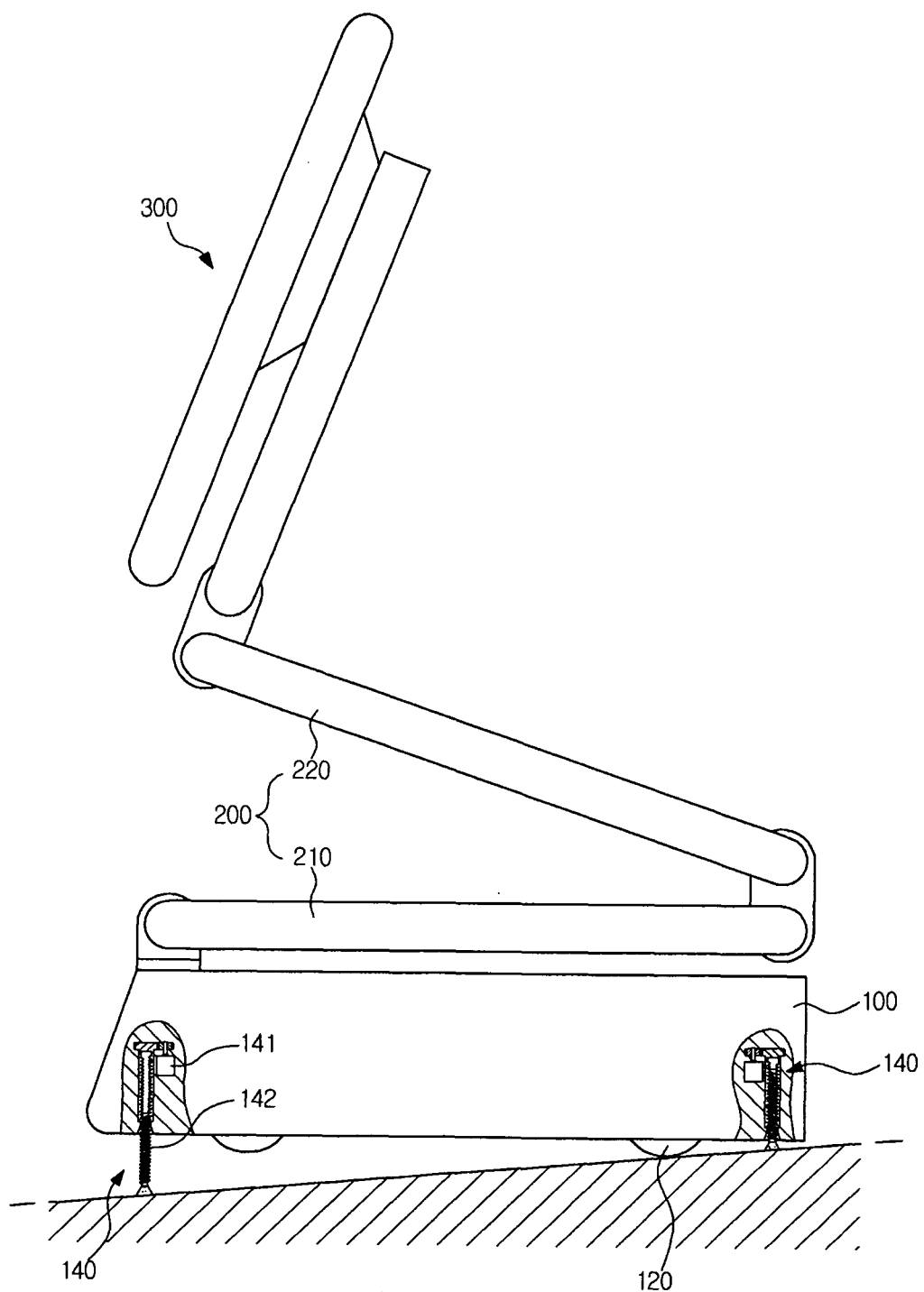
FIG. 11 is a sectional view showing the operational procedure of a support unit according to an embodiment.

Hereinafter, a robot according to a second embodiment will be described with reference to FIGS. 8 to 11. The same reference numerals will be assigned to elements identical to those of the previous embodiment, and details thereof will be omitted in order to avoid redundancy. FIGS. 8 and 9 are perspective views the robot 10 according to the second embodiment, and FIG. 10 is an enlarged view showing a portion of the robot 10 of FIG. 9. FIG. 11 is a sectional view showing the operational procedure of a support unit.

As shown in FIGS. 8 to 11, according to the second embodiment, the robot includes a body 100, a bending device 200, and a display device 300. The body 100 includes a sliding plate 130. The bending device 200 is coupled to the body 100 to adjust the motion thereof in an up, down, left, or right direction according to the eye position of the user. The display device 300 is coupled with the bending device 200 to provide various information to the user.

The body 100 includes the sliding plate 130 to slidably move back and forth. The body 100 is provided on a top surface thereof with a rack gear 132. The rack gear 132 may be fixed to the left or right side of the body 100, or alternatively, to a central portion of the body 100. A pinion gear 131 may be mounted on a bottom surface of the sliding plate 130 such that the pinion gear 131 is engaged with the rack gear 132. The body 100 includes a driving motor (not shown) to provide driving force to the pinion gear 131 such that the sliding plate 130 can move back and forth.

The sliding plate 130 may be coupled with the body 100 in various structures to move back and forth. In addition, those skilled in the art generally know that the shape and the details of the sliding plate 130 can be variously changed without deviating from the scope and the spirit of the disclosure.

In addition, the body 100 includes a support unit 140 to fix the position of the robot 10. In other words, the support unit 140 can prevent the robot 10 having the bending unit capable of performing tilt/pan motion from being inclined and falling by way of a gear unit 141 and a support member 142 coupled with the gear unit 141. The support unit 140 can support the robot 10 through the support member 142 coupled with the gear unit 141 when the robot 10 moves along an inclined surface or slope. Although it is shown in drawings that the support unit 140 serves as a screw protruding downward according to the operation of the gear unit 141, the form of the support unit 140 may be modified or changed as generally known to those skilled in the art.

As described above, according to the embodiments, the robot 10 can rotate up, down, left, or right such that the screen of the display device 300 is matched with the eye position of a user by improving the degree of freedom and the flexibility of the robot 10.

Although few embodiments have been shown and described, it would be appreciated by those skilled in the art that changes may be made in these embodiments without departing from the principles and spirit of the disclosure, the scope of which is defined in the claims and their equivalents.

What is claimed is:

1. A robot comprising:
a body;
a display device including a recognition unit, which detects a position of a user, to rotate about the body according to the position of the user; and
at least one bending device coupling the body with the display device such that the body and the display device rotate frontward, rearward, clockwise, or counterclockwise according to a detection state of the recognition unit,
wherein the at least one bending device is coupled to the body so as to rotate frontward, rearward, clockwise, or counterclockwise with respect to the body, and the display device is coupled to the at least one bending device so as to rotate frontward, rearward, clockwise, or counterclockwise with respect to the at least one bending device.

2. The robot of claim 1, wherein the bending device includes a first bending unit coupled with the body and a second bending unit coupled with the first bending unit to rotate frontward, rearward, clockwise, or counterclockwise.

3. The robot of claim 2, further comprising a pan/tilt driving unit wherein the first bending unit is coupled with the second bending unit by the pan/tilt driving unit.

4. The robot of claim 3, wherein the pan/tilt driving unit includes at least one pan driving unit allowing the second bending unit and the display device to rotate clockwise or counterclockwise, and at least one tilt driving unit allowing the second bending unit and the display device to rotate frontward or rearward.

5. The robot of claim 4, wherein the tilt driving unit includes a first tilt driving unit installed in the first bending unit and a second tilt driving unit installed in the second bending unit.

6. The robot of claim 2, further comprising at least one first sub pan/tilt driving unit coupling the body with the first bending unit, wherein the first sub pan/tilt driving unit allows the first and second bending units and the display device to rotate frontward, rearward, clockwise, or counterclockwise.

7. The robot of claim 1, wherein the body includes a sliding plate slidably moving back and forth.

8. The robot of claim 7, wherein the body includes at least one support unit to fix a position of the robot.

9. A robot comprising:
a body;
a display device including a recognition unit, which detects a position of a user, to rotate about the body according to the position of the user;
at least one bending device coupling the body with the display device such that the body and the display device rotate frontward, rearward, clockwise, or counterclockwise according to a detection state of the recognition unit,
wherein the bending device includes a first bending unit coupled with the body and a second bending unit coupled with the first bending unit to rotate frontward, rearward, clockwise, or counterclockwise; and
at least one second sub pan/tilt driving unit coupling the second bending unit with the display device, wherein the second sub pan/tilt driving unit allows the display device to perform a tilt/pan motion.

10. A robot comprising:
a body;
a display device including a recognition unit, which detects a position of a user, to rotate about the body according to the position of the user;
at least one bending device coupling the body with the display device such that the body and the display device rotate frontward, rearward, clockwise, or counterclockwise according to a detection state of the recognition unit, wherein the bending device includes a first bending unit coupled with the body and a second bending unit coupled with the first bending unit to rotate frontward, rearward, clockwise, or counterclockwise; and a pan/tilt driving unit to couple the first bending unit with the second bending unit, wherein the pan/tilt driving unit includes at least one pan driving unit allowing the second bending unit and the display device to rotate clockwise or counterclockwise, and at least one tilt driving unit allowing the second bending unit and the display device to rotate frontward or rearward, wherein the tilt driving unit has a ratchet structure and includes a solenoid switch.

11. A robot comprising:

a body including a sliding plate slidably moving back and forth;

a display device including a recognition unit, which detects a position of a user, to rotate about the body according to the position of the user;

at least one bending device coupling the body with the display device such that the body and the display device rotate frontward, rearward, clockwise, or counterclockwise according to a detection state of the recognition unit; and a rack gear fixedly mounted on the sliding plate, and a pinion gear fixedly mounted on the body such that the pinion gear is engaged with the rack gear.

12. A robot comprising:

a body;

at least one bending device coupled with the body to rotate frontward, rearward, clockwise, or counterclockwise with respect to the body according to a detected posture and a detected eye position of a user; and a display device coupled with the bending device to rotate frontward, rearward, clockwise, or counterclockwise with respect to the bending device to provide various information to the user, wherein the display device includes a recognition unit to detect the posture and the eye position of the user.

13. The robot of claim 12, further comprising a pan/tilt driving unit, wherein the bending device includes a first bending unit coupled with the body, and a second bending unit coupled with the first bending unit by a pan/tilt driving unit.

14. The robot of claim 12, wherein the body includes a sliding plate disposed below the at least one bending device to move the at least one bending device horizontally in a back and forth direction.

15. A robot comprising:

a body including a sliding plate slidably moving back and forth and at least one support unit to fix a position of the robot;

a display device including a recognition unit, which detects a position of a user, to rotate about the body according to the position of the user;

at least one bending device coupling the body with the display device such that the body and the display device rotate frontward, rearward, clockwise, or counterclockwise according to a detection state of the recognition unit; and a first sub pan/tilt driving unit and a second sub pan/tilt driving unit, wherein the body is coupled with the bending device by the first sub pan/tilt driving unit, and the bending device is coupled with the display device by the second sub pan/tilt driving unit.

16. A robot comprising:

a body;

at least one bending device coupled with the body to rotate frontward, rearward, clockwise, or counterclockwise with respect to the body according to a detected posture and a detected eye position of a user; and a display device coupled with the bending device to rotate frontward, rearward, clockwise, or counterclockwise with respect to the bending device to provide various information to the user, wherein the body includes at least one support unit disposed in a lower portion of the body, wherein the at least one support unit includes a member protruding downward out of the body to contact a surface upon which the robot is disposed.

17. A robot comprising:

a body;

at least one bending device coupled with the body to rotate frontward, rearward, clockwise, or counterclockwise with respect to the body according to a detected posture and a detected eye position of a user; and a display device coupled with the bending device to rotate frontward, rearward, clockwise, or counterclockwise with respect to the bending device to provide various information to the user;

wherein when the robot is disposed on an inclined surface, a member of a support unit protrudes downward out of the body to contact the surface upon which the robot is disposed to maintain the robot in a horizontal posture.

* * * * *